Aug. 27, 1935.   R. A. GOEPFRICH   2,012,664

BRAKE

Filed April 27, 1931

INVENTOR.
RUDOLPH A. GOEPFRICH
BY
ATTORNEY

Patented Aug. 27, 1935

2,012,664

UNITED STATES PATENT OFFICE 2,012,664

BRAKE

Rudolph A. Goepfrich, South Bend, Ind., assignor to Bendix Brake Company, South Bend, Ind., a corporation of Illinois Application April 27, 1931, Serial No. 533,250

19 Claims. (Cl. 188—78)

This invention relates to internal expanding brakes, and more particularly to operating means for the friction element of an internal expanding brake.

An important object of the invention is to provide actuating means for a friction element of an internal expanding brake including a cam and a cable for controlling the cam, the structure and arrangement of the cam being such that the ratio of travel of the friction element to the travel of the cable is practically equal in forward and reverse braking.

Another object of the invention is to provide an internal expanding brake having a friction element, a single anchor for the element and means for actuating the element including a cam, together with means associated with the cam for adjusting the over-all length of the element to compensate for wear.

Other objects of the invention will appear from the following description taken in connection with the drawing forming a part of this specification, and in which.

Figure 1:
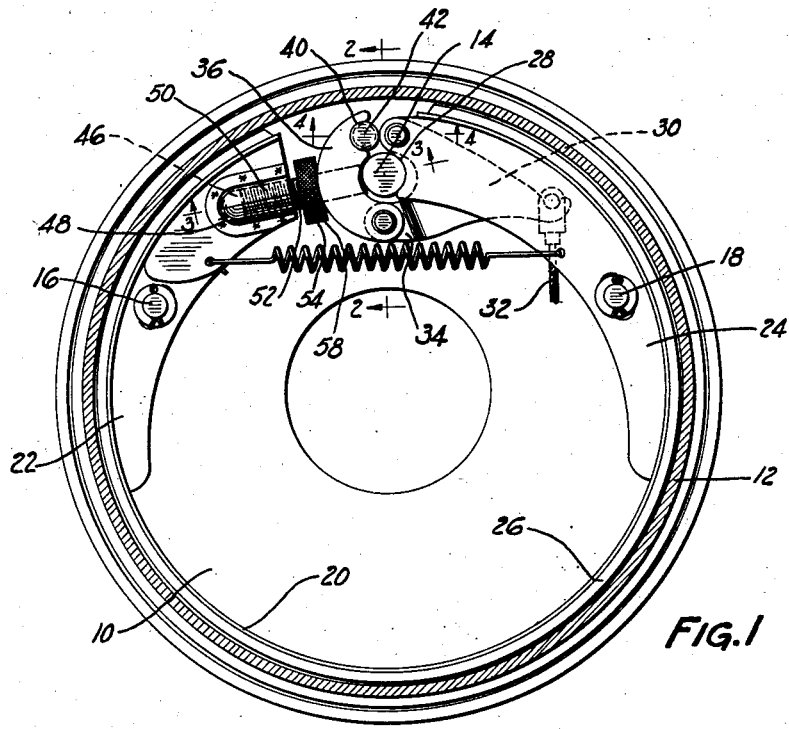
Figure 1 is a vertical sectional view taken just back of the head of the drum illustrating the friction element in side elevation and showing the invention as applied.
Figure 3:
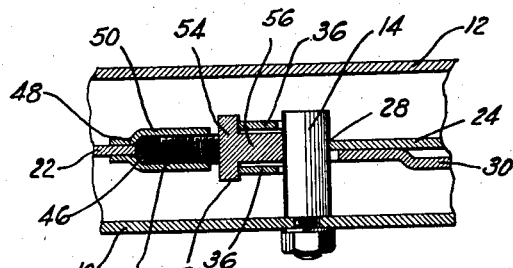
Figure 3 is a sectional view substantially on line 3—3, Figure 1.
Figure 2:
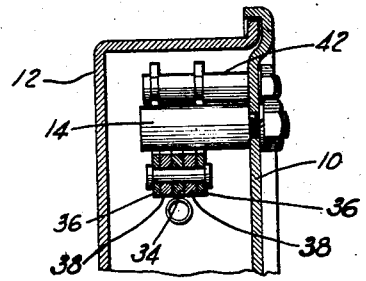
Figure 2 is a vertical sectional view substantially on line 2—2, Figure 1.
Figure 4:
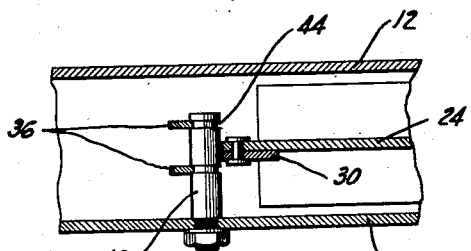
Figure 4 is a sectional view substantially on line 4—4, Figure 1.

Referring to the drawing for more specific details of the invention, 10 represents a fixed support such as a backing plate. Associated with the backing plate is a rotatable drum 12 which may be secured to a wheel, not shown. Positioned on the backing plate is a fixed anchor 14 and suitable steady rests 16 and 18.

Supported on the backing plate by the steady rests 16 and 18 is a friction element including a split band 20 having web sections 22 and 24, and suitably secured to the band is a lining 26 adaptable for cooperation with the braking surface of the drum. The web 24 on one end of the band has a notch 28 providing a shoulder adaptable for the reception of the anchor 14 and pivoted on the web is a lever 30 connected by a suitable tension member or cable 32 or source of power, not shown.

The lever 30 has an arm 34 to which is pivotally connected corresponding links 36 with suitable spacers 38 interposed. The free ends of the links 36 are notched as indicated at 40 to embrace a fixed support 42 positioned on the backing plate. Preferably the support 42 is provided with circumferential grooves 44 for the reception of the notched ends of the links 36, so that these arms may be retained in spaced relation.

The web 22 on the other end of the band 20 has a slot 46 and spot-welded or otherwise secured to the opposite sides of the band are plates 48 having semi-cylindrical registering portions bridging the slot in the band to provide a sleeve 50 which is internally threaded to receive a screw 52.

The screw 52 is provided with a collar 54 and an elongated head 56. The head 56 extends between the links 36 and engages the anchor 14 by line contact. The collar on the screw engages arcuate edges of the links 36 and this collar is milled upon its periphery, as indicated at 58 so that it may be easily manipulated. By adjusting the screw 52 the friction element of band 20 may be adjusted in proper spaced relation to the braking surface of the drum.

In operation, force is applied to the tension member or cable 32, and this force is transmitted to the lever 30. Upon movement of the lever 30 the links 36 pivoted to the lever and fulcrumed on the fixed support 42 transmit the force through the screw 52 to the friction element. When force is applied to the friction element, the element is moved into drum engagement. During this operation the friction element is not disengaged from the anchor, hence there is no clicking incident to the friction element moving away from and returning to its anchor. The structure of the operative cam, the arrangement of the control cable therefor and the relation of these elements to the friction element is such that the ratio of travel of the friction element to the travel of the cable is practically equal in both forward and reverse braking.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element having separable ends, an anchorage for said ends, a lever pivoted to one of the ends, a fixed support, and a link pivoted to the lever and fulcrumed on the fixed support and engaging the other end of the friction element and transmitting the braking torque to said anchorage from said other end.

2. A brake comprising a friction element having separable ends, a fixed support between the separable ends, a lever pivoted to one end of the friction element, a link pivotally connected to the lever and fulcrumed on the support and adaptable for engagement with the other end of the friction element, and anchorage means taking the braking torque directly from one of said ends and through said link from the other of said ends.

3. A brake comprising a friction element having separable ends, a fixed support between the separable ends, a lever pivoted to one end of the friction element, spaced corresponding links pivoted to the lever and fulcrumed on the support and a member threaded in the other end of the friction element engaging the links.

4. A brake comprising a friction element having separable ends, an anchor positioned between the separable ends, a fixed support adjacent the anchor, a lever pivoted to one end of the friction element, spaced corresponding links pivotally connected to the lever and fulcrumed on the fixed support and a member threaded in the other end of the friction element extending between the links and engaging the anchor.

5. A brake comprising a friction element having separable ends, an anchor between the separable ends, a fixed support adjacent the anchor, a lever pivoted to one end of the friction element, spaced corresponding links pivotally connected to the lever and fulcrumed on the fixed support, a member threaded into the other end of the friction element extending between the links and engaging the anchor and a collar on the threaded member engaging the links.

6. A brake comprising a backing plate, a rotatable drum associated therewith, an anchor on the backing plate, a fixed support adjacent the anchor, a friction element having separable ends one of which is provided with a shoulder adapted to embrace the anchor, a lever pivoted to the shouldered end of the friction element, spaced corresponding links pivotally connected to the lever and fulcrumed on the fixed support, a screw threaded into the other end of the friction element and extending between the links for engagement with the anchor and a collar on the screw engaging the links.

7. A brake comprising a backing plate, a rotatable drum associated therewith, an anchor on the backing plate, a fixed support adjacent the anchor, a friction element on the backing plate for cooperation with the drum, a shoulder on one end of the friction element adapted to embrace the anchor, a lever pivoted to the shouldered end of the friction element, spaced links pivoted to the lever and partially encircling the anchor with their free ends embracing the fixed support, a screw threaded into the other end of the friction element projecting between the spaced links for engagement with the anchor, a collar on the screw engaging the links and a cable connected to the lever.

8. A brake comprising friction means having separable ends with an anchor adjacent thereto, pivotally-connected applying members acting respectively on said ends and one of which is formed with an opening and a thrust member engaging one of said ends and extending through said opening and engaging the anchor.

9. A brake comprising friction means having separable ends with an anchor adjacent thereto, pivotally-connected applying members acting respectively on said ends and one of which is formed with an opening, and a thrust member adjustably mounted on one of said ends and extending through said opening and engaging the anchor.

10. A brake comprising friction means having separable ends with an anchor adjacent thereto, pivotally-connected applying members acting respectively on said ends and one of which is formed with an opening, a fixed pivot for one of said members and a movable pivot connecting the other member to one of said ends, and a thrust member engaging one of said ends and extending through said opening and engaging the anchor.

11. A brake having an anchor, an applying linkage having a fixed fulcrum adjacent said anchor, a thrust member extending through an opening in a part of said linkage and engaging the anchor, and a collar on said thrust member operatively engaged by the linkage.

12. A brake having an anchor, an applying linkage having a fixed fulcrum adjacent said anchor, and a thrust member extending through an opening in a part of said linkage and engaging the anchor.

13. An applying device comprising pivotally-connected members one of which has an opening, and a thrust member in said opening having a collar engaged by the member having the opening.

14. An applying device comprising pivotally-connected members one of which has an opening, and an adjustably-extensible thrust member in said opening having a collar engaged by the member having the opening.

15. A brake comprising a backing plate and friction means carried thereby having separable ends, an anchor between said ends, and applying means acting on said ends and including interengaging pivotally-movable levers moving parallel to the backing plate and one of which is mounted on one of said ends and which has its end moving in the space between the backing plate and the friction means, together with a tension member connected to said end of the lever and acting through said one lever to rock both levers to apply the brake.

16. A brake comprising a backing plate and friction means carried thereby having separable ends, an anchor between said ends, and applying means acting on said ends and including interengaging pivotally-movable levers moving parallel to the backing plate and one of which is mounted on one of said ends and which has its end moving in the space between the backing plate and the friction means, together with a tension member connected to said end of the lever and acting through said one lever to rock both levers to apply the brake, one of the levers being arranged to float with said separable ends of the friction means.

17. A brake comprising a backing plate and friction means carried thereby having separable ends, an anchor between said ends, and applying means acting on said ends and including interengaging pivotally-movable levers moving parallel to the backing plate and one of which is mounted on one of said ends and which has its end moving in the space between the backing plate and the friction means, together with a tension member connected to said end of the lever and acting through said one lever to rock both levers to apply the brake, one of the levers being arranged to float with said separable ends of the friction means, the other of said levers being rockable about an axis that remains fixed relatively to the backing plate.

18. A brake comprising a backing plate and friction means carried thereby having separable ends, an anchor between said ends, an operating lever pivoted to one of said ends and movable in a plane paralleling the backing plate in the space between said plate and the portion of the friction means adjacent said end, and a thrust device movably engaging said operating lever and extending past and engageable with said anchor and including an adjustable part arranged between said anchor and said other of said ends and adjustably engaging said other end.

19. A brake comprising a backing plate and friction means carried thereby having separable ends, an anchor between said ends, an operating lever pivoted to one of said ends, and a pivotally mounted thrust device movably engaging said operating lever and extending past and engageable with said anchor and the other of said separable ends and including an adjustable part arranged between said anchor and said other end.

RUDOLPH A. GOEPFRICH.